Patented Aug. 4, 1936

2,049,662

UNITED STATES PATENT OFFICE 2,049,662

VANADIUM COMPOUNDS OF N-METHYLENE SULPHONIC ACIDS OF DIAMINO DIHYDROXY ARSENOBENZENE AND SODIUM SALTS THEREOF

George W. Raiziss and Abraham I. Kremens, Philadelphia, Pa., assignors to Abbott Laboratories, North Chicago, Ill., a corporation of Illinois No Drawing. Application December 4, 1933, Serial No. 700,830

6 Claims. (Cl. 260—15)

This application is in part a continuation of our co-pending application Serial No. 660,456, filed March 13, 1933.

Our invention relates to improved vanadium compounds of arsenobenzene which are suitable for use as pharmaceuticals, and particularly in the treatment of infectious diseases of the human organism.

In Schumacher British specification, No. 306,847, applied for February 25, 1929, there are described certain vanadium compounds of arsenobenzene derivatives. Schumacher employs alkali salts of vanadic acids, such as sodium orthovanadate and ammonium meta-vanadate, to react with the arseno compounds. The resulting products, however, have properties which render them highly undesirable for our purposes. Thus, they are insoluble in water; they are dark in color, and they are highly toxic.

We have discovered that by reacting on arsenobenzene compounds with vanadium oxy salts which are acid in reaction, there are obtained water-soluble products of light color which have comparatively low toxicity and are very effective in the treatment of infections, especially spirochetic diseases.

Example 38 grams of disodium-diamino-dihydroxyarsenobenzene-dimethylene-sulphonate (sulph-arsphenamine) are dissolved in 100 cc. of water. To this solution is added a solution, in 100 cc. of water, of 60 grams of divanadyl tetrachloride, otherwise known as hypovanadic hydrochloride, $V_2O_2Cl_4 \cdot 5H_2O$. This vanadium salt is especially suitable for our purposes because of the fact that it is highly soluble in water and is not decomposed by it, and is acid in reaction. The combined liquids are stirred for five minutes and filtered into ten volumes of a mixture of equal parts of methyl alcohol and ether. The arsenobenzene-vanadium product precipitates as a light-gray powder. It is filtered and dried in vacuo. It is soluble in water without the addition of alkali or any other material.

Other compounds of arsenobenzene having the desirable properties mentioned above may be obtained by the use of other vanadium oxy salts which are acid in reaction, such as vanadyl sulphate—$V_2O_2(SO_4)_2 \cdot XH_2O$.

To obtain the sodium salt, we dissolve the acid product in water and add dilute sodium hydroxide solution to a slight alkaline test to litmus paper. The alkaline solution is passed into a mixture of absolute methyl alcohol and ether. The sodium salt precipitates as a brown powder.

While a formula for our new compound cannot be deduced with certainty, the following is suggested as a probable formula:

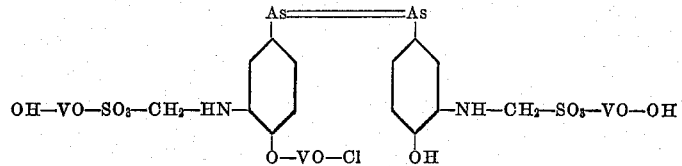

The sodium salt is believed likely to have the formula:

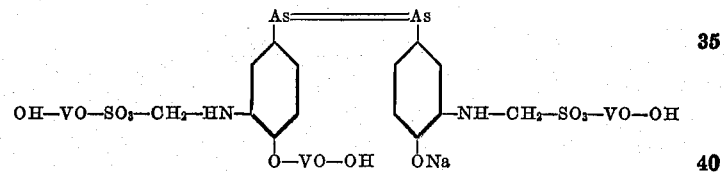

Various changes and modifications coming within the spirit of our invention will doubtless suggest themselves to those skilled in the art. Hence, we do not wish to be limited to the specific embodiments herein disclosed, except to the extent indicated by the appended claims, which are to be interpreted as broadly as the state of the art will permit.

We claim as our invention:

1. A method of producing a soluble vanadium salt of arsenobenzene comprising reacting in aqueous solution upon sulpharsphenamine with a soluble vanadium oxy salt which is acid in reaction.

2. A process as defined in claim 1, wherein the acid vanadium salt is divanadyl tetrachloride.

3. A method of preparing a soluble vanadium salt of arsenobenzene in solid form comprising reacting in aqueous solution upon sulpharsphenamine with a soluble vanadium oxy salt which is acid in reaction, and precipitating the vanadium compound of arsenobenzene by the addition of an organic liquid in which it is insoluble.

4. A process as defined in claim 3, wherein the acid vanadium salt is divanadyl tetrachloride.

5. A water-soluble vanadium compound of arsenobenzene formed by reacting in aqueous solution upon sulpharsphenamine with a soluble oxy salt of vanadium which is acid in reaction.

6. A water-soluble vanadium compound of arseno-benzene formed by reacting in aqueous solution upon sulpharsphenamine with divanadyl tetrachloride.

GEORGE W. RAIZISS.
ABRAHAM I. KREMENS.